United States Patent
Choi et al.

(10) Patent No.: US 10,794,621 B2
(45) Date of Patent: Oct. 6, 2020

(54) AIR CONDITONER AND METHOD FOR CONTROLLING AN AIR CONDITIONER

(71) Applicant: LG ELECTRONICS INC., Seoul (KR)

(72) Inventors: Changmin Choi, Seoul (KR); Taekyu Ha, Seoul (KR); Sunghwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 123 days.

(21) Appl. No.: 15/816,300

(22) Filed: Nov. 17, 2017

(65) Prior Publication Data

US 2018/0142928 A1 May 24, 2018

(30) Foreign Application Priority Data

Nov. 18, 2016 (KR) .................. 10-2016-0154396
Nov. 18, 2016 (KR) .................. 10-2016-0154397

(51) Int. Cl.
*F25B 45/00* (2006.01)
*F25B 49/02* (2006.01)
(Continued)

(52) U.S. Cl.
CPC ............. *F25B 45/00* (2013.01); *F25B 30/02* (2013.01); *F25B 43/006* (2013.01); *F25B 49/02* (2013.01);
(Continued)

(58) Field of Classification Search
CPC ........ F25B 45/00; F25B 43/006; F25B 49/02; F25B 2345/006; F25B 2345/001
See application file for complete search history.

(56) References Cited

U.S. PATENT DOCUMENTS 4,796,436 A * 1/1989 Voorhis .................. F25B 45/00
62/149
6,442,963 B1 * 9/2002 Pfefferle ............ B60H 1/00585
62/144
(Continued)

FOREIGN PATENT DOCUMENTS

EP 1 876 403 1/2008
EP 2 017 556 1/2009
EP 2 264 386 12/2010

OTHER PUBLICATIONS

European Search Report dated Mar. 22, 2018.

Primary Examiner — Nelson J Nieves
(74) Attorney, Agent, or Firm — Ked & Associates LLP

(57) ABSTRACT

An air conditioner and a method of controlling an air conditioner are provided. The air conditioner may include a compressor, an accumulator that recovers a liquid refrigerant contained in a refrigerant flowing into the compressor, an outdoor heat exchanger that performs heat exchange of air using the refrigerant, an outdoor unit fan that supplies outside air to the outdoor heat exchanger and discharges heat-exchanged air, a refrigerant charging pipe connected to a refrigerant pipe and allowing the refrigerant to the additionally introduced from the outside, a refrigerant charging valve installed in the refrigerant charging pipe to open and close the refrigerant charging pipe, and a controller that sets an operation mode so as to operate in a cooling operation or a heating operation upon setting of a refrigerant charging mode, sets an operation frequency of the compressor in accordance with a load of an indoor unit upon the setting of the refrigerant charging mode to allow the compressor to operate at the set operation frequency during the refrigerant charging, and calculates an amount of refrigerant in order to stop the refrigerant charging when a predetermined reference value is reached.

10 Claims, 8 Drawing Sheets

| CAPACITY OF INDOOR UNIT | COMPRESSOR | TARGET OPERATION FREQUENCY | |
|---|---|---|---|
| I1 | A | H2 | 201 |
| I2 | B | H1 | 202 |
| I3 | B | H3 | 203 |
| I4 | B | H5 | 204 |
| I5 | A+A | H2 | 205 |
| I6 | A+A | H4 | 206 |
| I7 | A+A | H5 | 207 |
| I8 | A+B | H6 | 208 |

I1 < I2 < I3
A < B < A+A
H1 < H2 < H3

(51) Int. Cl.
 *F25B 30/02* (2006.01)
 *F25B 43/00* (2006.01)

(52) U.S. Cl.
 CPC ... *F25B 2313/0294* (2013.01); *F25B 2345/00* (2013.01); *F25B 2345/001* (2013.01); *F25B 2345/003* (2013.01); *F25B 2345/006* (2013.01); *F25B 2400/13* (2013.01); *F25B 2600/0253* (2013.01); *F25B 2700/21152* (2013.01); *Y02B 30/741* (2013.01)

(56) References Cited

U.S. PATENT DOCUMENTS

| | | | |
|---|---|---|---|
| 2002/0026806 A1* | 3/2002 | Tsuboe | F04C 28/08 62/505 |
| 2006/0117776 A1* | 6/2006 | Choi | F25B 31/002 62/228.5 |
| 2009/0255284 A1* | 10/2009 | Yoshimi | F24F 3/065 62/149 |
| 2010/0223940 A1* | 9/2010 | Kotani | F25B 45/00 62/149 |
| 2011/0088414 A1* | 4/2011 | Yamaguchi | F25B 49/005 62/77 |
| 2013/0067942 A1* | 3/2013 | Ochiai | F25B 49/02 62/126 |
| 2013/0104576 A1* | 5/2013 | Lee | F25B 13/00 62/80 |
| 2013/0160470 A1* | 6/2013 | Schuster | F25B 45/00 62/77 |
| 2014/0174114 A1* | 6/2014 | Tamaki | F25B 45/00 62/129 |
| 2015/0020536 A1* | 1/2015 | Lee | F25B 13/00 62/324.4 |
| 2015/0267951 A1* | 9/2015 | Berg | F25B 45/00 62/77 |

* cited by examiner

Fig.6

| CAPACITY OF INDOOR UNIT | COMPRESSOR | TARGET OPERATION FREQUENCY | |
|---|---|---|---|
| I1 | A | H2 | ~201 |
| I2 | B | H1 | ~202 |
| I3 | B | H3 | ~203 |
| I4 | B | H5 | ~204 |
| I5 | A+A | H2 | ~205 |
| I6 | A+A | H4 | ~206 |
| I7 | A+A | H5 | ~207 |
| I8 | A+B | H6 | ~208 |

$$\begin{array}{l} I1 < I2 < I3 \\ A < B < A+A \\ H1 < H2 < H3 \end{array}$$

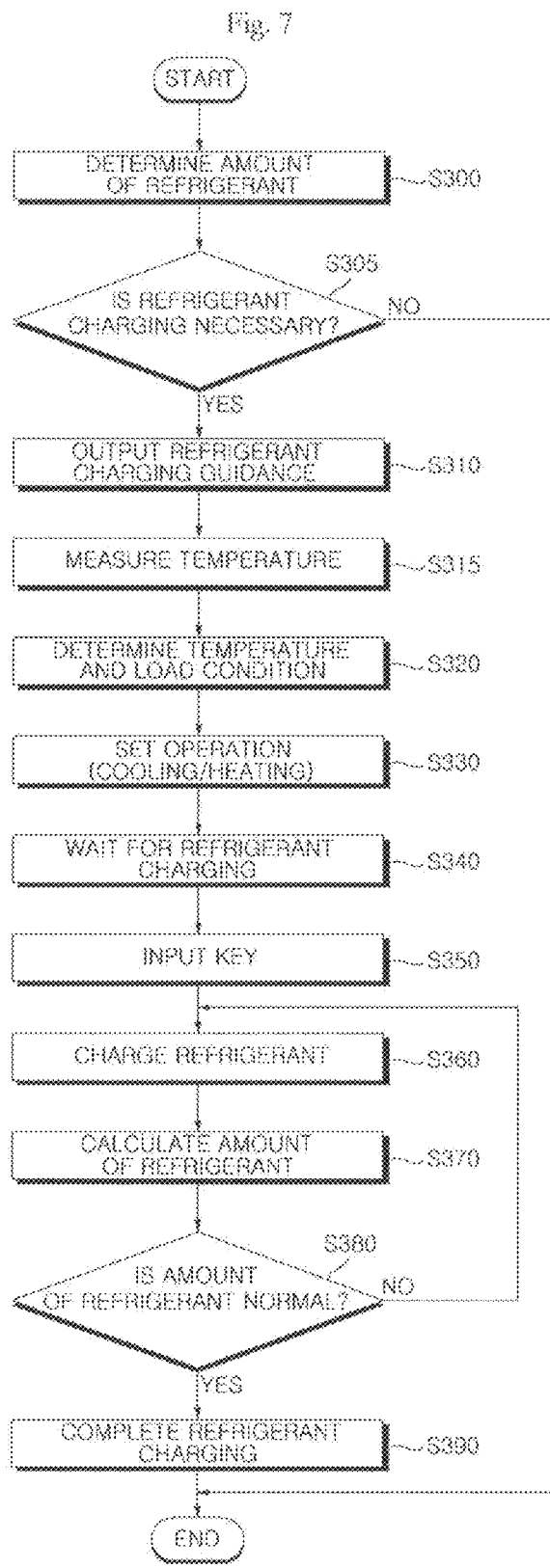

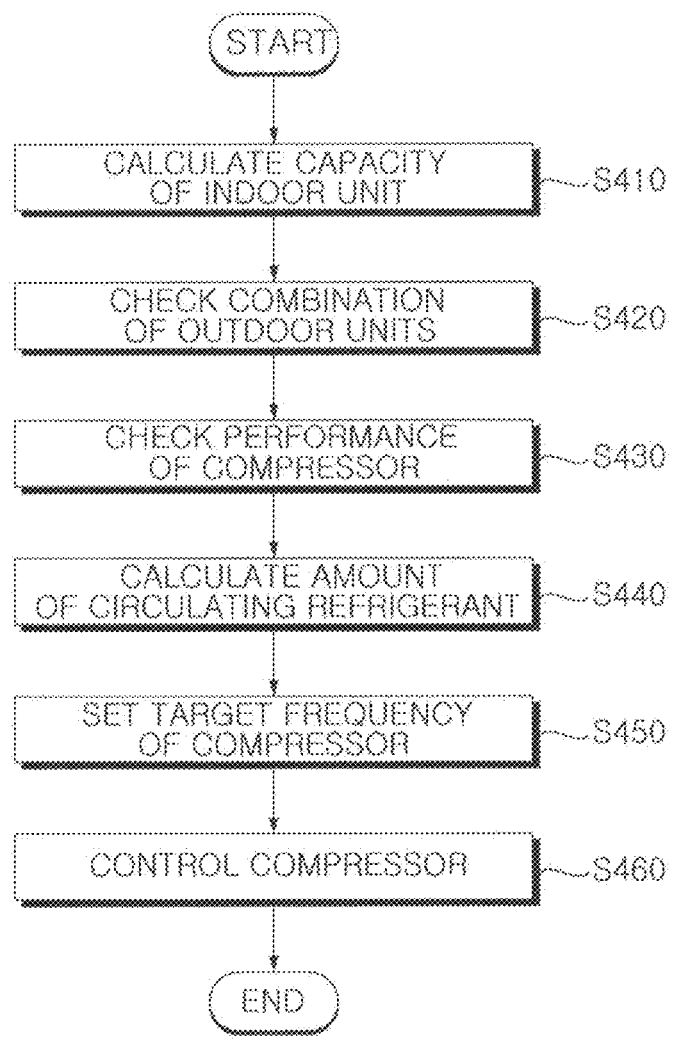

AIR CONDITONER AND METHOD FOR CONTROLLING AN AIR CONDITIONER

CROSS-REFERENCE TO RELATED APPLICATION(S)

This application claims the priority benefit of Korean Patent Application No. 10-2016-154396, filed in Korea on Nov. 18, 2016, and Korean Patent Application No, 10-2016-154397, filed in Korea on Nov. 18, 2016 in the Korean Intellectual Property Office, the disclosure of which is incorporated herein by reference.

BACKGROUND

1. Field

An air conditioner and a method for controlling an air conditioner are disclosed herein.

2. Background

An air conditioner is installed to provide a comfortable indoor environment for a human by discharging cold air into a room, adjusting the indoor temperature, and purifying the indoor air. Generally, the air conditioner includes an indoor unit that includes a heat exchanger, and an outdoor unit that includes a compressor and a heat exchanger to supply refrigerant to the indoor unit.

The air conditioner includes the indoor unit including a heat exchanger and the outdoor unit including a compressor and a heat exchanger, which are separately controlled and connected by a refrigerant pipe, and refrigerant compressed by the compressor of the outdoor unit is supplied to the heat exchanger of the indoor unit through a refrigerant pipe. Refrigerant heat-exchanged in the heat exchanger of the indoor unit again flows into the compressor of the outdoor unit through the refrigerant pipe. Thus, the indoor unit discharges cold air into a room through heat exchange using refrigerant.

As described above, the air conditioner discharges cool or warm air in a process where refrigerant circulates and exchanges heat, and operates in a cooling or heating mode. When the air conditioner is operated for a certain period of time, the amount of refrigerant becomes insufficient. If refrigerant becomes insufficient, the efficiency of cooling and heating decreases. Accordingly it is necessary to supplement refrigerant.

As a typical air conditioner is configured to supplement refrigerant through the cooling operation, there is a limitation in that the cooling operation needs to be performed in order to refresh refrigerant even when the external temperature is low. Also, when the air conditioner performs the cooling operation at a low temperature, the compression ratio is lowered and the operation frequency of the compressor is lowered, which may cause the compressor to stop.

Thus, when the cooling operation cannot be performed, there is a limitation in that refrigerant needs to be supplemented if the cooling operation is enabled after waiting until the outdoor temperature rises to a certain temperature or higher. In some implementations as the air conditioner operates in a low efficiency state until refrigerant is replenished, energy is wasted and user's dissatisfaction may increase.

On the other hand, in order to replenish refrigerant during the heating operation, a user has to approach an installation place and manually replenish refrigerant. However, as a user needs to approach the installation place with a scale and cannot know the amount of refrigerant additionally required, there is a difficulty in refreshing refrigerant.

Also, the timing of refrigerant charging needs to be determined by determining the amount of refrigerant during the refrigerant charging, but when the frequency of the compressor is changed, an error may occur according to the determination of the amount of refrigerant.

Generally, as the compressor operates on the basis of a target low pressure and a target high pressure, the operation frequency of the compressor is frequently changed. Accordingly, as if is difficult to accurately determine the amount of refrigerant, there is a difficulty in determining the refrigerant charging completion time.

BRIEF DESCRIPTION OF THE DRAWINGS

Embodiments will be described in detail with reference to the following drawings in which like reference numerals refer to like elements, and wherein:

FIG. 6 is a view illustrating a load setting method for setting a compressor operation frequency according to an embodiment;

FIG. 7 is a flowchart illustrating a method for controlling an air conditioner according to an embodiment; and FIG. 8 is a flowchart illustrating a method for changing a refrigerant of an air conditioner according to an embodiment.

DETAILED DESCRIPTION

Figure 1:
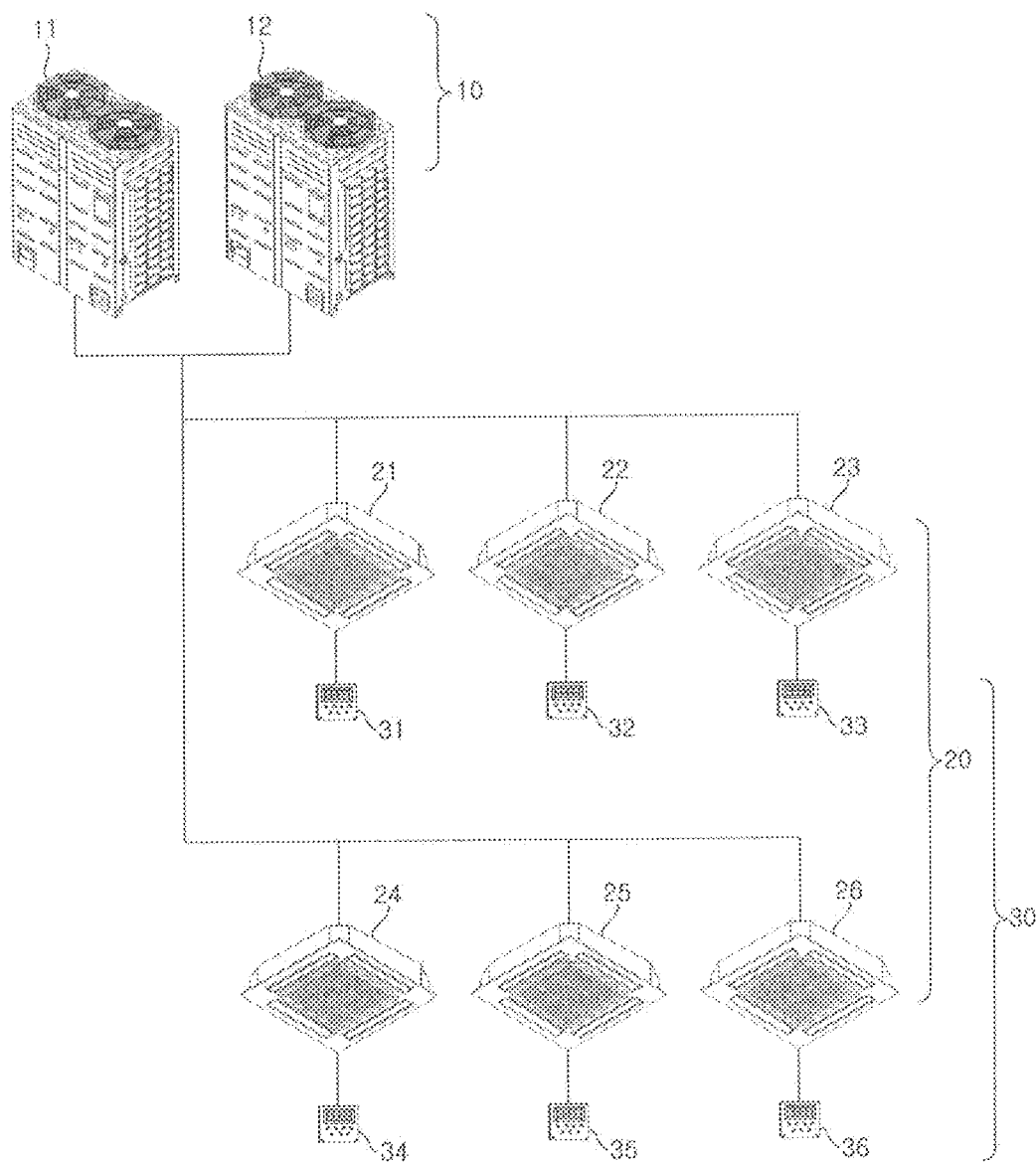
FIG. 1 is a view illustrating a configuration of an air conditioner according to an embodiment.

The foregoing and other objects, features, aspects and advantages of embodiments will become more apparent from the following detailed description of embodiments when taken in conjunction with the accompanying drawings. Exemplary embodiments will now be described with reference to the accompanying drawings. The embodiments may, however, be embodied in many different forms and should not be construed as being limited to the embodiments set forth herein. Rather, these embodiments are provided so that this disclosure will be thorough and complete, and will fully convey the scope to those skilled in the art. In the drawings, the shapes and dimensions may be exaggerated for clarity, and the same reference numerals will be used throughout to designate the same or like components.

Hereinafter, exemplary embodiments will foe described with reference to the accompanying drawings.

FIG. 1 is a view illustrating a configuration of an air conditioner according to an embodiment. As shown in FIG. 1, the air conditioner may include a plurality of indoor units 20 (21 to 26), at least one outdoor unit 10 (11 and 12), and a plurality of remote controllers 30 (31 to 36) connected to the plurality of indoor units, respectively.

The air conditioner may further include a controller connected to the plurality of indoor units 20 and the outdoor unit 10 to control and monitor an operation thereof. The air conditioner may also include a distributor that adjusts refrigerant supplied to the plurality of indoor units 20 while keeping a certain amount of refrigerant such that the air conditioner simultaneously performs a cooling operation and a heating operation.

The controller may control the operation of the plurality of indoor units 20 and the outdoor units 10 in response to an input user command, periodically receive and store data on operation states of the plurality of indoor units 20 and the outdoor units 10 corresponding thereto, and output the operation state through a monitoring screen. The controller may be connected to the plurality of indoor units 20 to perform operation setting, lock setting, schedule control, group control, peak control for power use, and demand control for the indoor units 20, for example. The controller may include a plurality of central controllers connected to each other, and if necessary, may be connected through a certain network.

The remote controller 30 may be connected to the indoor unit through a wired or wireless communication method to input a user command into the indoor unit, and receive and output data of the indoor unit. The remote controller 30 may transmit a user command to the indoor unit according to a connection method with the indoor unit, and may perform one-way communication in which data of the indoor unit is not received or perform two-way communication in which data is transmitted and received to/from the indoor unit.

The remote controller 30 may be connected to any one of the plurality of indoor units, transmit control commands to the connected indoor unit, and outputs information of the connected indoor unit. For example, the first remote controller 31 may be connected to the first indoor unit 21, and the second remote controller 32 may be connected to the second indoor unit 22. In some implementations, one remote controller is connected to a plurality of indoor units, such that the settings of the plurality of indoor units may be simultaneously changed through one remote controller.

Although the air conditioner may include the outdoor unit 10 and the indoor unit 20, the air conditioner may further include at least one of a ventilation unit, an air cleaning unit, a humidification unit, or a heater, for example. These units may operate in linkage with the operations of the indoor unit and the outdoor unit.

The outdoor units 10 (11 and 12) may be respectively connected to the plurality of indoor units 20 by a refrigerant pipe, and supply refrigerant to the indoor units. The outdoor unit 10 may periodically communicate with the plurality of indoor units to exchange data with each other, and change the operation according to the operation setting changed from the indoor unit.

The indoor unit 20 may include an electronic expansion valve for that expands refrigerant supplied from the outdoor unit 10, an indoor heat exchanger that exchanges heat of refrigerant, an indoor unit fan that allows indoor air to flow into the indoor heat exchanger and exposes heat-exchanged air to the indoor air, a plurality of sensors, and a controller that controls the operation of the indoor unit. The indoor unit 20 may include a discharge port that discharges the heat-exchanged air. The discharge port may be provided with a wind direction adjusting unit or adjuster that opens and closes the discharge port and controls a direction of the discharged air. The indoor unit may control intake air and discharge air and adjust an air flow rate by controlling a rotational speed of the indoor unit fan.

The indoor unit 20 may further include an output unit or output that displays the operation state and sets information of the indoor unit and an input unit or input that setting data. In some implementations, the indoor unit 20 may transmit setting information on the operation of the air conditioner to the remote controller 30, may output the setting information through the remote controller 30, and may receive data.

The outdoor unit 10 may operate in a cooling mode or a heating mode in response to data received from the connected indoor unit 20 or a control command of the controller, and supply refrigerant to the connected indoor unit. When the plurality of outdoor units 11 and 12 is connected, each of the outdoor units may be connected to the plurality of indoor units as shown in the drawing, and refrigerant may be supplied to the plurality of indoor units through a distributor.

For example, the first outdoor unit 11 and the second outdoor unit 12 may be connected to each other to supply refrigerant to first to sixth indoor units. When a distributor is connected, the first outdoor unit and the second outdoor unit may supply refrigerant to the plurality of indoor units through the distributor. The first outdoor unit 11 may be connected to first to third indoor units 21 to 23, and the second outdoor unit 12 may be connected to fourth to sixth indoor units 24 to 26 to supply refrigerant to the indoor units which are connected to each other.

The outdoor unit 10 may include at least one compressor 1 that compresses refrigerant and discharges high-pressure gas refrigerant, an accumulator 5 that separates gas refrigerant and liquid refrigerant from the refrigerant and prevents ungasified liquid refrigerant from being Introduced Into the compressor 1, an oil collector 2 that collects oil from refrigerant discharged from the compressor 1, an outdoor heat exchanger that condenses or evaporates refrigerant by heat-exchange with the outside air, an outdoor unit fan 141 that introduces air into the outdoor heat exchanger and discharges heat-exchanged air to the outside to more smoothly perform heat exchange of the outdoor heat exchanger, a four-way valve 4 that changes a flow path of refrigerant according to an operation mode of the outdoor unit at least one pressure sensor that measures a pressure, at least temperature sensor 3 and 9 that measures a temperature, and a controller that controls the operation of the outdoor unit and performs communication with other units. The outdoor unit 10 may further include a plurality of sensors, valves, and subcoolers, for example. A description thereof will be omitted below. Reference numerals described herein refer to FIG. 4 described hereinafter.

Figure 2:
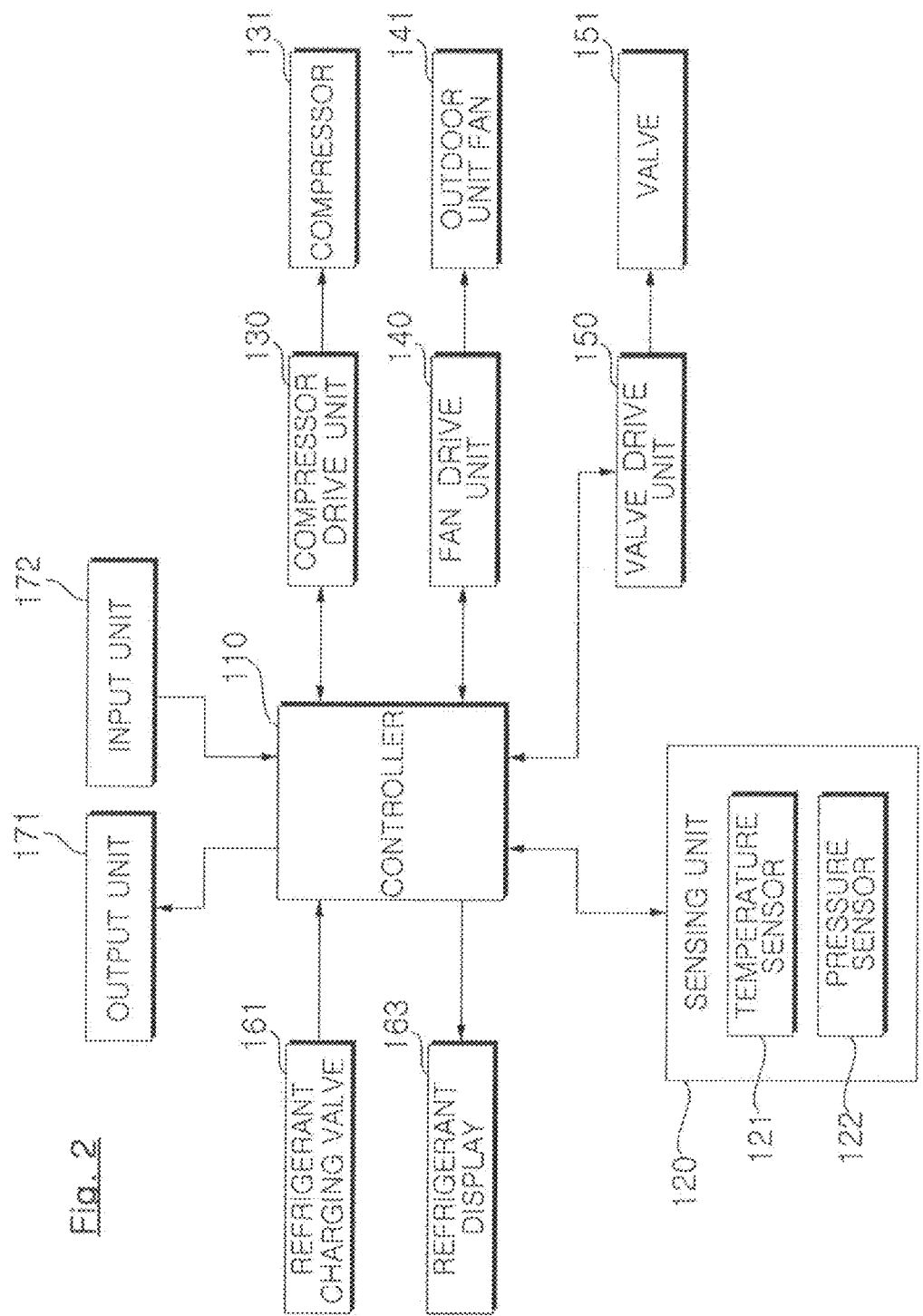
FIG. 2 is a view illustrating a control configuration of an outdoor unit of FIG. 1 according to an embodiment.

FIG. 2 is a view illustrating a control configuration of an outdoor unit of FIG. 1 according to an embodiment. As shown in FIG. 2, the outdoor unit 10 may include a compressor drive unit 130, a compressor 131, an outdoor unit fan 141, a fan drive unit 140, a valve drive unit 150, a valve 151, a sensing unit or sensor 120, an output unit or output 171, an input unit or input 172, and a controller 110 that controls an overall operation of the outdoor unit.

The outdoor unit 10 may further include a refrigerant charging valve 161 that charges refrigerant and a refrigerant display 163. The outdoor unit 10 may also include a data unit that stores control data for controlling the operation of the compressor 131 and the outdoor unit fan 141, communication data for communicating with the indoor unit or the controller, data transmitted or received from the outside, and operation data which are generated of sensed during the operation.

Hereinafter, a description of other components of the outdoor unit 10 will discussed hereinafter.

The input unit 172 may include at least one of a button, a switch, or a touch input unit, and input user commands or certain data into the outdoor unit. For example, a power key, a test run key, or an address assignment key may be provided.

The output unit 171 may include at least one of a lamp controlled to be turned on or off, a speaker, or a display unit or display to output an operation state of the outdoor unit. The lamp may output whether or not the outdoor unit operates according to a turn/off operation and color of the lamp, and the speaker may output a predetermined warning sound and an effect sound to output the operation state of the outdoor unit. The display unit may output an operation setting or operation state of the outdoor unit using a guide message or warning configured with a combination of at least one of letters, numbers, or images.

The outdoor unit fan 141 may supply outdoor air to the outdoor heat exchanger through the rotation operation of the fan, and allow the heat exchanged cold/hot air to be discharged to the outside. As the outdoor heat exchanger operates as a condenser during the cooling operation and operates as an evaporator during the heating operation, the outdoor unit fan 141 discharges cold air or hot air heat exchanged in the outdoor heat exchanger to the outside.

The fan drive unit 140 may control the driving of a motor provided in the outdoor unit fan 141 to control the rotating operation of the outdoor unit fan 141. In response to a control signal of the controller 110, the fan drive unit 140 may operate the outdoor unit fan 141 at a predetermined rotational speed, or stop the operation. The fan drive unit 140 may apply an operation signal according to a type of the motor provided in the outdoor unit fan 141 to control the rotational speed of the outdoor unit fan 141.

The valve drive unit 160 may control a flow rate of refrigerant or a flow direction of refrigerant by controlling an opening/closing state and opening/closing degree of a plurality of valves 151 provided in the outdoor unit. As the plurality of valves 151 is disposed at different positions, the valve drive unit may also be provided in plurality. The valve 151 may include a four-way valve 4, an expansion valve, and a hot gas valve, for example.

The compressor 1 or 131 may compress and discharge the introduced refrigerant, thereby allowing the refrigerant to circulate from the outdoor unit to the indoor unit. When low-temperature and low-pressure gas refrigerant is introduced, the compressor 1 or 131 may compress the refrigerant and thus discharge gas refrigerant of high temperature and high pressure.

The compressor drive unit 130 may control the operation power supplied to the motor provided in the compressor 131, and thus, control the operation frequency of the compressor. The compressor drive unit 130 may include an inverter that controls the driving of the compressor.

The communication unit may communicate with another outdoor unit or an indoor unit connected thereto, communicate with the controller to transmit and receive operation data, and receive a control command from the controller to apply the control command to the controller. In some implementations, the communication unit may communicate by different communication methods in accordance with objects to be communicated with. For example, the communication unit may exchange data with the indoor unit, the outdoor unit, and the controller using a RS 232, RS 422, or RS485 communication protocol, or through Zigbee, Wi-Fi, or Bluetooth.

The data unit may store an execution program for each function of the outdoor unit, data for operation control, and data to be transmitted and received. The data unit may be various storage devices, sued as ROM, RAM, EPROM, flash drive, and hard drive as hardware.

The refrigerant charging valve 161 may be installed in the refrigerant charging pipe 162, and be used when supplementing refrigerant from the outside. The refrigerant charging valve 161 may allow refrigerant to be additionally introduced through the refrigerant charging pipe 162. When the refrigerant charging valve 161 is opened after a refrigerant drum (not shown) is connected to the refrigerant charging pipe 162, refrigerant in the refrigerant drum may be automatically introduced into the refrigerant pipe through the refrigerant charging pipe by the pressure of the refrigerant pipe. When the refrigerant charging valve is closed, the introduction of the refrigerant may be stopped.

The refrigerant display 163 may be controlled by the controller 110, and output a refrigerant chargeable state or a refrigerant charging state. When the refrigerant display 163 displays that refrigerant is chargeable, a user may open the refrigerant charging valve 161 to start charging the refrigerant. Based on the refrigerant charge state displayed on the refrigerant display 163, a user may close the refrigerant charging valve 161 to stop the refrigerant charging when the charging is completed. The refrigerant display 163 may include light-emitting diodes, 7-segments, and LCDs, for example.

The refrigerant charging valve 181 may be basically operated by a user, but if necessary, the opening/closing of the refrigerant charging valve 161 may be determined by the controller 110. For example, when the refrigerant drum is connected to the refrigerant charging pipe 162, the controller 110 may sense this connection to open the refrigerant charging valve 161, and may determine the refrigerant charging state to allow the refrigerant charging valve 161 to be closed. Also, when a refrigerant charging button is provided and manipulated by a user, the controller may control the refrigerant charging valve 161 to open the refrigerant charging valve 161. When, the controller determines the refrigerant, charging state and it is determined that the refrigerant amount is proper, the controller may control the refrigerant charging valve 161 to stop the refrigerant charging.

The sensing unit 120 may include a plurality of sensors to detect an operation state and an abnormality of the outdoor unit. The sensing unit 120 may include a temperature sensor 121 and a pressure sensor 122.

The temperature sensor 121 may measure a temperature of the outdoor unit refrigerant pipe, a temperature of the heat exchanger, a temperature of the outdoor unit fan, and an outdoor temperature, and input the measured temperatures into the controller 110. The pressure sensor 122 may be installed in the refrigerant pipe, pleasure a pressure of the refrigerant pipe, and input the measured pressure into the controller 110. A plurality of the pressure sensor 122 may be installed in the refrigerant pipe, and may be installed, for example, at a refrigerant inlet portion or inlet and a refrigerant outlet portion or outlet of the compressor, respectively.

The controller 110 may control input and output of the input unit 172 or the output unit 171 and control operation according to data transmitted and received through the communication unit. Also, the controller 110 may generate control commands for controlling operations of the compressor 131, the outdoor unit fan 141, and the valve 131, and applies the control commands to the compressor drive unit 130, the fan drive unit 140, and the valve drive unit 150 to control the operations.

The controller 110 may determine the operation state corresponding to data input from the sensing unit 120 during the operation of the outdoor unit, and output an error when determining an abnormality. The controller 110 may calculate the amount of refrigerant circulated based on the data input from the temperature sensor 121 and the pressure sensor 122 to determine whether or not the amount of refrigerant is insufficient. If the amount of refrigerant is insufficient, the controller 110 may output an alarm through the output unit 171, or may transmit a refrigerant shortage signal to a connected indoor unit. Thus, the indoor unit may output an alarm for refrigerant shortage or refrigerant supplement.

Also, when the refrigerant charging valve 161 operates and the refrigerant charging starts, the controller 110 may re-calculate the amount of refrigerant to determine, whether the refrigerant amount is insufficient or appropriate, and thus, output the refrigerant charging state through the refrigerant display 163. If it is determined that the amount of refrigerant is appropriate, the controller 110 may control the four-way valve 4 to change the flow path of refrigerant or control the flow of refrigerant such that refrigerant is no longer introduced. The controller 110 may control the refrigerant charging valve 161 to be closed, or output a charge completion notice to the refrigerant display 163 such that the refrigerant charging valve 161 is closed fey a user.

The controller 110 may operate in the heating mode or cooling mode in accordance with the outdoor temperature, the indoor temperature, and the desired temperature, and determine the amount of refrigerant according to the operation mode during the refrigerant charging.

The outdoor heat exchanger may operate as a condenser during the cooling operation, and operate as an evaporator during the heating operation. The indoor heat exchanger of the indoor unit may operate as an evaporator and a condenser, respectively. As the heat exchanger which is a criterion of determination of the amount of refrigerant is changed according to the operation mode and the required amount of refrigerant is changed in accordance with a combination of connected indoor units, the controller 110 may determine the amount of refrigerant differently according to the operation mode. In some implementations, the amount of refrigerant is determined based on the outdoor heat exchanger in the cooling mode and based on the indoor heat exchanger in the heating mode.

When the refrigerant is charged during the operation, the controller 110 may maintain the operation mode for the existing operation, and set the refrigerant charging mode to ignore a predetermined operation selling and allow the indoor unit and the outdoor unit to operate according to the refrigerant charging mode. The controller 110 may measure the indoor temperature when the refrigerant is charged, and allow the outdoor unit and the indoor unit to operate in the heating operation or the cooling, operation according to the indoor temperature. Also, after the controller 110 determines a required amount of refrigerant, the controller 110 may output a guidance for charging refrigerant to the refrigerant display 163 when it is ready to supplement the refrigerant.

When the refrigerant charging, button is input, the controller 110 may open the refrigerant charging valve 161 to start charging. The controller 110 may determine the amount of circulating refrigerant during the refrigerant charging, and output the refrigerant charging state on the refrigerant display 163. Also, when the refrigerant charging is completed, the controller 110 may output a guidance on the refrigerant display 163. When the refrigerant charging is completed, the controller 110 closes the four-way valve 4 to stop the refrigerant charging.

Also, when the refrigerant is charged in the operation stop state, the controller 110 may perform a blowing operation for a predetermined time, and then measure the indoor temperature. The controller 110 may operate the outdoor unit in either the heating operation or the cooling operation corresponding to the indoor temperature and the outdoor temperature, and transmit an operation command to a connected indoor unit such that the connected indoor unit is operated. The controller 110 may fix the operation frequency such that the compressor operates at a set or predetermined operation frequency when refrigerant is charged, and allow the compressor to operate according to a predetermined operation when refrigerant is charged.

In order to determine the amount of circulating refrigerant during the refrigerant charging, the controller 110 may interrupt all factors that influence the refrigerant determination, and also fix the operation frequency of the compressor to determine the amount of refrigerant. When refrigerant is charged during the heating operation, the outdoor heat exchanger may operate as an evaporator and the indoor unit may operate as a condenser. Accordingly, information of the Indoor unit becomes Important: for determining the amount of refrigerant. Thus, as the amount of required refrigerant according to the number of the indoor units to be connected, the operation load, and the capacity of the outdoor unit to be connected changes, the controller 110 calculates and sets the operation frequency for determining the amount of refrigerant based thereon.

That is, the necessary refrigerant amount may be calculated based on the load of the indoor unit or the compressor capacity of the outdoor unit, and the compressor operation frequency for circulating the corresponding refrigerant amount may be calculated to operate the compressor. Accordingly, even if a present amount of refrigerant does not reach a required amount of refrigerant an insufficient amount of refrigerant may be supplemented through refrigerant charging.

The controller 110 may continuously calculate the amount of circulated refrigerant during the operation, and stop the refrigerant charging when the amount of refrigerant reaches a necessary amount of refrigerant.

Figure 3:
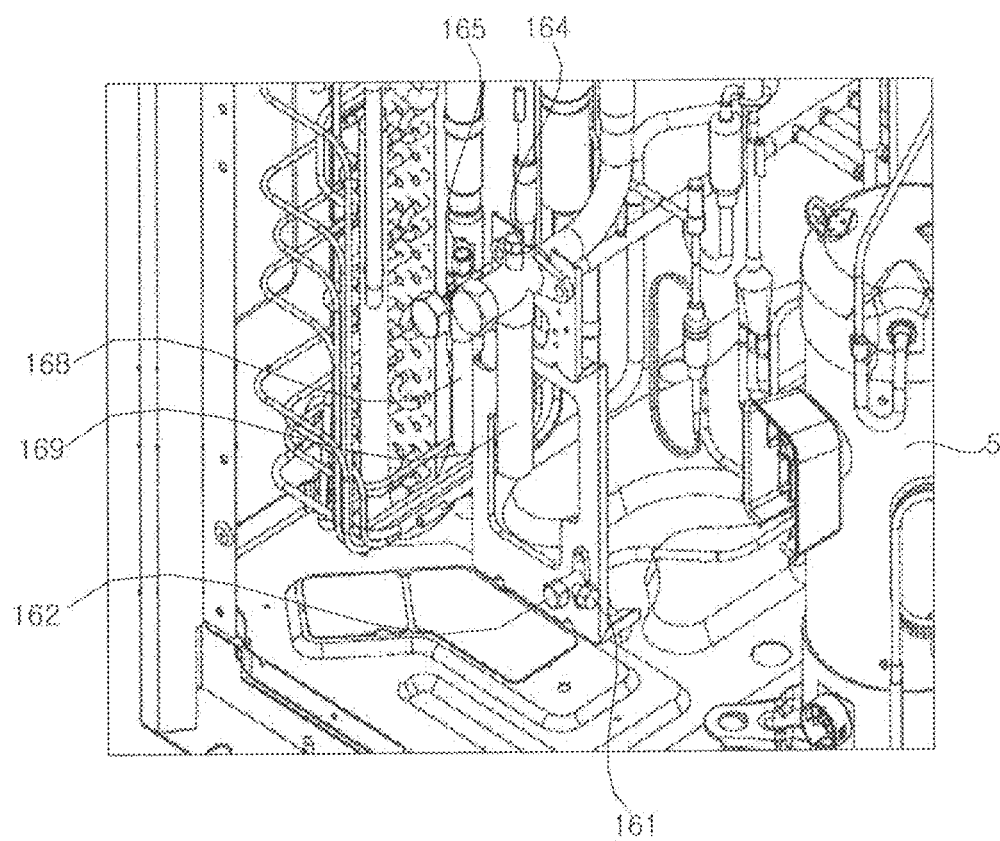
FIG. 3 is a view illustrating a valve for charging a refrigerant in an outdoor unit according to an embodiment.

FIG. 3 is a view illustrating a valve for charging a refrigerant in an outdoor unit according to an embodiment. As shown in FIG. 3, an outdoor heat exchanger, accumulator 5, a receiver, and a compressor may be disposed inside a case of outdoor unit 10, and the refrigerant pipe may be complicatedly disposed. The illustrated internal structure of the outdoor unit is an example, and the arrangement thereof may be changed according to the outdoor unit model and manufacturer.

The refrigerant pipe may include a gas pipe 169 and a liquid pipe 168, respectively, and the gas pipe and the liquid pipe are provided with service ports 164 and 165, respectively. The service port may be installed in a pipe connected to the four-way valve. When the air conditioner performs the cooling operation, refrigerant may be charged through the service port. However, upon the heating operation, as the refrigerant circulation is changed, the refrigerant changing through the service port is impossible.

Accordingly, refrigerant charging pipe 162 for charging refrigerant during the heating operation and the cooling operation may be installed, and refrigerant charging valve 161 may be provided in the refrigerant charging pipe 162. The refrigerant charge pipe 162 may extend from a point of the refrigerant pipe of the outdoor unit where refrigerant is introduced, and may be disposed at a position where a user may check when opening the case of the outdoor unit. For example, the refrigerant charging pipe may extend to a position adjacent to a door of the outdoor unit. Accordingly, when a user opens the door of the outdoor unit, the refrigerant drum may be easily connected to the refrigerant charging pipe 162.

The refrigerant charging pipe 162 may be connected to the refrigerant drum in which refrigerant to fee charged is stored. When the refrigerant charging valve 161 is opened refrigerant in the refrigerant drum may be automatically introduced into the refrigerant pipe through the refrigerant charging pipe 162 by a pressure difference of the refrigerant pipe.

Also, the outdoor unit may include refrigerant display 163 and a refrigerant charging button adjacent to the refrigerant charging pipe 162. When the refrigerant charging button is provided, the controller 110 may control the refrigerant charging valve in response to the button input. On the other hand, opening/closing of the refrigerant charging valve may be controlled by a manual operation of a user. For example, when a separate refrigerant charging button is not provided, the refrigerant charging may start and end by manipulating the refrigerant charging valve.

Figure 4:
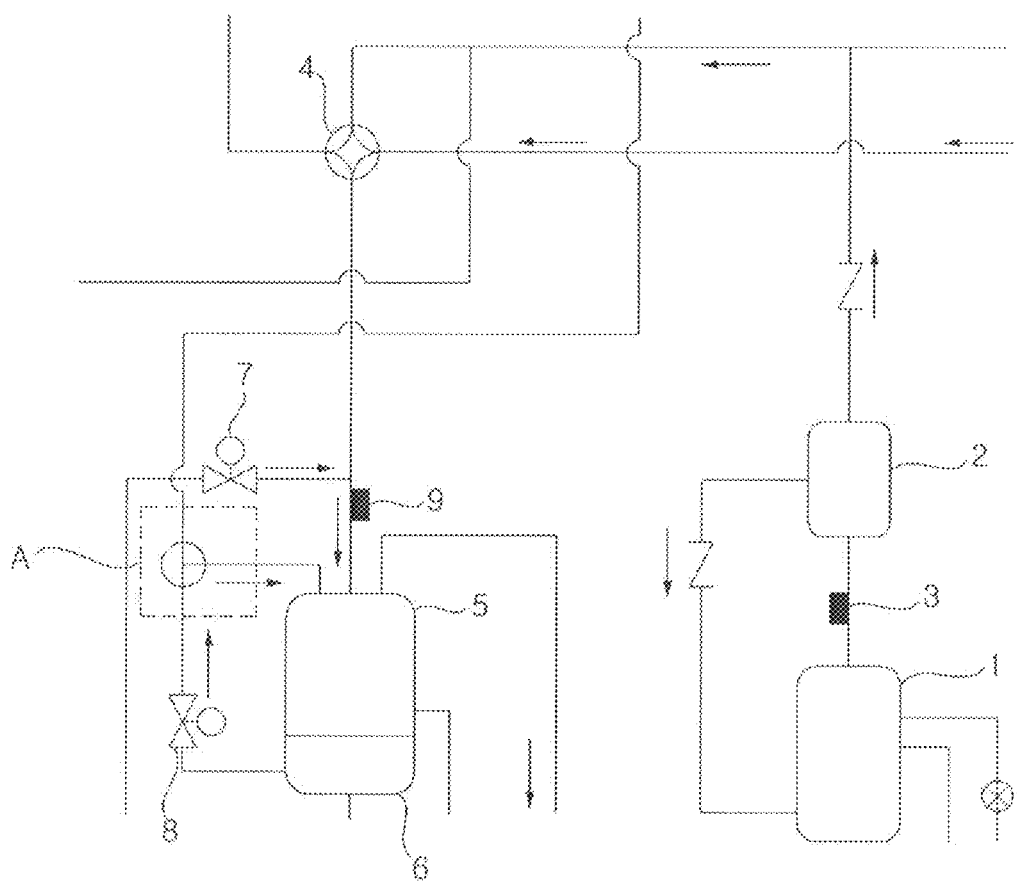
FIG. 4 is a view illustrating a position of a valve for charging a refrigerant in an outdoor unit according to an embodiment.

FIG. 4 is a view illustrating a position of a valve for charging a refrigerant in an outdoor unit according to an embodiment. As the refrigerant charging pipe 162 is connected to the refrigerant pipe, the refrigerant in the refrigerant drum may be introduced through the refrigerant charging pipe. In some implementations, the charged refrigerant may be a liquid refrigerant.

As shown in FIG. 4, the refrigerant charging pipe 162 may be connected to a position A at which refrigerant flows into the accumulator 5 on the refrigerant pipe of the outdoor unit, particularly, to or at one side of a pipe of the refrigerant inlet of the accumulator 5.

The accumulator 5 may recover liquid refrigerant from refrigerant flowing into the compressor 1 or 131, and discharge only gas refrigerant such that the gas refrigerant flows into the compressor. The discharge port of the accumulator 5 may be provided with a gas pipe and a liquid pipe, respectively. After liquid refrigerant is recovered, gas refrigerant may be discharged to the gas pipe and connected to the compressor. The recovered liquid refrigerant may be discharged to the liquid pipe. The refrigerant charged through the refrigerant charging pipe may flow into the accumulator, and be recovered by the accumulator to be introduced into the liquid pipe and circulate.

The accumulator 5 may be connected to a subcooler bypass valve 7 connected to a bypass pipe of a subcooler, and a footway valve by piping. Temperature sensor 9 may be installed at the refrigerant inlet of the accumulator to sense the temperature of the introduced refrigerant. The accumulator 5 may be connected to the refrigerant pipes of the subcooler bypass valve 7 connected to the bypass pipe of the subcooler and the four-way valve.

As the refrigerant charging pipe 162 is connected to the pipe inlet of the accumulator 5, when refrigerant is charged through the refrigerant charging pipe, all of the charged refrigerant flows into the accumulator 5. Accordingly, refrigerant charging is possible regardless of the cooling operation and the heating operation.

Figure 5:
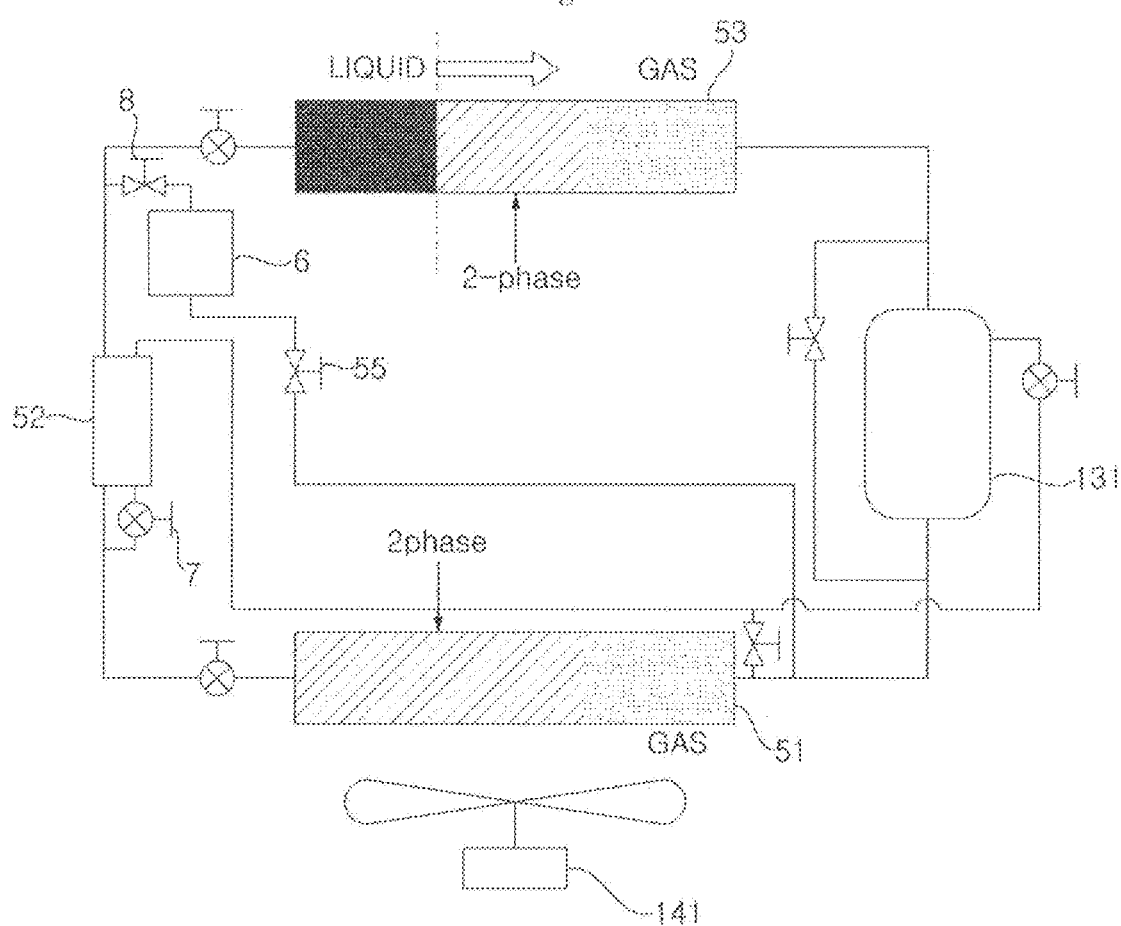
FIG. 5 is a view illustrating an operation of an air conditioner for charging a refrigerant according to an embodiment.

FIG. 5 is a view illustrating an operation of an air conditioner for charging a refrigerant according to an embodiment. As shown in FIG. 5, refrigerant is compressed by the compressors 1 and 131, and discharged as gas refrigerant of high temperature and high pressure. During the cooling operation, refrigerant is condensed while passing through an outdoor heat exchanger 51, and becomes liquid refrigerant of low temperature and low pressure. During the heating operation, refrigerant flows into an indoor heat exchanger 53, and is condensed in the indoor heat exchanger 53. In some implementations, heat emitted in the process in which refrigerant is condensed is discharged to the outside by an outdoor unit fan 141 or an indoor unit fan, and the outside air flows into the outdoor heat exchanger. During the heating operation, warm air is discharged to the room through the indoor unit fan, and during the cooling operation, warm air is discharged to the outside through the outdoor unit fan 141.

In the heating mode, the refrigerant liquefied in the indoor heat exchanger flows into the outdoor heat exchanger 51 through a subcooler 52, and is gasified. The gasified refrigerant passes through the accumulator, and then flows into the compressor 131.

In the heating mode, the refrigerant of the inlet-side pipe of the outdoor heat exchanger is in a state where liquid and gas are mixed, and the refrigerant of the outlet-side pipe becomes a gaseous state. Even if liquid refrigerant is partially included in refrigerant, liquid refrigerant is separated by the accumulator.

In the heating mode, the refrigerant of the inlet-side pipe of the indoor heat exchanger 53 is in the gaseous state, and gas and liquid are mixed in the heat exchange process. Also, the refrigerant of the outlet side of the indoor heat exchanger 53 becomes a liquid state.

As the refrigerant inlet of the compressor 1 or 131 is connected to the accumulator 5, the liquid refrigerant contained in the refrigerant is recovered by the accumulator, and the gas refrigerant is introduced into the compressor.

As refrigerant to be charged flows into the accumulator 5, the controller 110 reduces the amount of refrigerant in the accumulator before the refrigerant charging starts. Accordingly, the pressure difference increases, thereby facilitating the introduction of refrigerant through the refrigerant charging pipe.

On the other hand, in the process of circulating the refrigerant through the refrigerant pipe and performing heat exchange, when a large amount of refrigerant is circulated, a portion of refrigerant is stored in receiver 8. The controller 110 controls the valve drive unit 150 to cut off and close a receiver valve 8 provided in the receiver 6 in order to determine whether refrigerant is charged and the amount of insufficient refrigerant. When refrigerant is additionally stored in the receiver or refrigerant stored in the receiver flows into the pipe, the amount of circulating refrigerant varies. Accordingly, the controller 110 turns off the receiver valve 8 to accurately determine the amount of refrigerant, thereby preventing the amount of refrigerant from changing due to movement of refrigerant stored in the receiver 6.

During the refrigerant charging, the controller 110 fixes the subcooler bypass valve 7 in a closed state such that refrigerant may be automatically introduced due to the pressure difference. Accordingly, a differential pressure may be formed in the refrigerant pipe, and the subcooling degree of the indoor unit may be kept constant. Also, as a change in characteristics of refrigerant may be prevented, the controller 110 may accurately calculate the amount of refrigerant.

When refrigerant is charged the controller 110 may generate and transmit a control command to the indoor unit 20 such that the opening degree of the electronic expansion valve of the indoor unit 20 may be maintained at a constant value. A degree of subcooling of the indoor unit may be uniformly maintained by fixing the opening degree of the electronic expansion valve of the indoor unit, and the change in the characteristics of the refrigerant amount may be prevented. Also, the controller 110 may apply a control command such that the indoor units are operated in all rooms.

Also, the controller 110 may apply a control command to the fan drive unit 140 such that the relational speed of the outdoor unit, fan 141 may be uniformly maintained. Accordingly, the high pressure of the refrigerant pipe may be prevented from rising, and the low pressure may fee prevented from falling. Also, the low pressure may be maintained.

When refrigerant is charged, the controller 110 may close a Vapor Infection (VI) valve at the same time as the compressor starts, and then controls a VI suction valve to be closed after a certain period of time. Accordingly, the refrigerant flow of VI is blocked, and refrigerant may be prevented from accumulating in the inside. The VI is used to Improve the efficiency of the compressor by injecting refrigerant vaporized in the subcooler into the compressor. However, when refrigerant is charged, the valve is controlled to be closed in order to reduce the influence on the amount of refrigerant which is calculated.

Also, the controller 110 may fix the operation frequency such that the compressor 1 or 131 operates in proportion to the capacity of the indoor unit. When the operation frequency of the compressor is changed, the amount of refrigerant may also be changed. Accordingly, the operation frequency of the compressor is allowed to be uniformly maintained until the amount of refrigerant is determined to charge the refrigerant and the refrigerant charging may be completed.

When refrigerant is charged, the controller 110 may close a Vapor Injection (VI) valve at the same time as the compressor starts, and then control a VI suction valve to be closed after a certain period of time. Accordingly, the refrigerant flow of VI is blocked, and refrigerant may be prevented from accumulating in the inside. The VI is used to improve the efficiency of the compressor by injecting refrigerant vaporized in the subcooler into the compressor. The VI valve is a valve for injecting refrigerant, and the VI suction valve allows refrigerant to flow into the outlet-side refrigerant pipe of the heat exchanger when the refrigerant injection is not performed. However, when refrigerant is charged, the valve is controlled to be closed in order to reduce the influence on the amount of refrigerant which is calculated.

After the control as described above, the controller 110 may determine the amount of refrigerant corresponding to a condensation temperature, an indoor unit inlet pipe temperature, an indoor temperature, an outdoor temperature input through the temperature sensor, a suction superheat degree, and an opening degree of the main valve. As the opening degree of the main valve increases as the amount of flowing refrigerant increases, the controller 110 may determine the amount of flowing refrigerant using the opening degree of the main valve. Based on the capacity of the connected indoor unit, the controller 110 may determine whether the determined amount of refrigerant is appropriate or insufficient, and calculate an insufficient amount of refrigerant when the amount of refrigerant is insufficient. If necessary, the controller 110 may output an insufficient amount of refrigerant on the refrigerant display 163.

The controller 110 may repeatedly determine the amount of refrigerant even when refrigerant is being charged, and stop the refrigerant charging when the amount of refrigerant reaches a criterion according to a load of the outdoor unit.

The controller 110 may control the four-way valve 4 to stop the refrigerant charging, and output a guidance according to completion of the charging on the refrigerant display 163. Accordingly, a user may close the refrigerant charging valve 161, and separate the refrigerant drum from the refrigerant charging pipe 162.

FIG. 6 is a view illustrating a load setting method for setting a compressor operation frequency according to an embodiment. As shown in FIG. 6, when the refrigerant charging mode is set, the controller 110 may set the operation frequency of the compressor 1 or 131 in accordance with the indoor unit load or the capacity of the outdoor unit.

As described above, the controller 110 may calculate the amount of refrigerant required based on the number of indoor units and at the capacity of the compressor of the outdoor unit, and calculate the operation frequency of the compressor for circulating the calculated amount of refrigerant. The controller 110 may apply the calculated operation frequency to the compressor drive unit, and the compressor drive unit may control the motor of the compressor to allow the compressor to operate at the set operation frequency.

In some implementations, as the indoor units operate in all rooms in the refrigerant charging mode, the controller 110 may set the operation frequency based on the number of connected indoor units and the capacity of the compressor of the outdoor unit. When a plurality of outdoor units is connected, the capacities of compressors of the outdoor units may be summed up to set the operation frequency.

The controller 110 may receive indoor unit capacity information and compressor capacity information from: the indoor unit and the outdoor unit. The controller 110 may sum the capacities of the indoor units, and set the operation frequency by stages according to the compressor capacity of the outdoor unit and the combination of the compressors.

Letters and numbers shown in FIG. 8 mean that the numerical value increases as the number written with the letters increases. For example, the indoor unit capacity I2 is larger than I1 and smaller than I3, and the capacity B of the compressor is larger than A and smaller than C. Also, the operation frequency H2 is larger than H1 and smaller than H3. Also, an outdoor unit provided with two compressors A is expressed as A+A is indicated, and an outdoor unit provided with compressors having different capacities is expressed as A+B. The compressor capacity A+A is larger than that of B.

When the capacity of the Indoor unit is I1 which is smallest and the capacity of the compressor is A, the operation frequency of the compressor may be set to H2 (201). On the other hand, when the indoor unit capacity is I2 and the compressor capacity is B, the operation frequency is set to H1 smaller than H2 (202). As the capacity of the compressor greatly increases compared with the capacity change of the indoor unit, the indoor unit capacity I2 may be used even if the compressor operates at a low operation frequency.

On the other hand, when the capacity of the indoor unit is increased from I2 to I3 and I4 (202 to 204) in the same compressor capacity B, the capacity of the compressor is the same and the load is increased. Accordingly, the operation frequency is set such that the operation frequency of the compressor increases from H1 to H3 and H5.

Also, when two compressors of capacity A are used, the operation frequency H2 may be set for the indoor unit capacity I5 (205). As the capacity of the compressor greatly increases compared with the capacity or the indoor unit, the compressor is set to operate at a low operation frequency.

When the indoor unit capacity increases from I5 to I6 and I7 (205 to 207) with respect to the same compressor capacity A+A, the operation frequency of the compressor is also set so as to increase from H2 to H4 and H6. Also, when the capacity of the indoor unit is 18 and the capacity of the compressor is A+B, the operation frequency may foe set to H6 (208).

Thus, the controller 110 sums the indoor unit capacities based on the received data, and sets the operation frequency of the compressor in accordance with the outdoor unit capacity. Also, when a plurality of compressors are provided, the controller sets operation frequencies for each of the plurality of compressors.

Generally, the compressor adjusts the amount of necessary refrigerant by changing the operation frequency based on the pressure of a high-pressure pipe and a low-pressure pipe. However, as it is necessary to determine, whether or not the amount of refrigerant is sufficient when refrigerant is being charging, the amount of refrigerant which is calculated varies if the operation frequency of the compressor is changed, which makes it difficult to accurately determine.

Accordingly, when refrigerant is charged, the controller controls the compressor to operate at a fixed operation frequency regardless of the pressure, thereby making it possible to accurately calculate the amount of refrigerant during the refrigerant charging.

In some implementations as the indoor units operate in all rooms, the controller determines the amount, of refrigerant necessary for the indoor units to operate in all rooms based on the capacity of the indoor unit and the capacity of the compressor, and calculates a minimum operation frequency for the all-room operation of the indoor units. Accordingly, during the refrigerant charging, refrigerant is introduced into the refrigerant pipe through the refrigerant charging pipe by the pressure difference of the refrigerant pipe, and insufficient refrigerant is automatically charged.

The controller may calculate the amount of circulating refrigerant necessary for circulation of each indoor unit in accordance with the capacity of the indoor unit, and calculate the volume of the refrigerant amount for each compressor capacity to calculate a unit frequency of the compressor for circulating the amount of circulating refrigerant once.

The controller may set the operation frequency of the compressor by multiplying the sum of the capacities of the plurality of Indoor units by the capacity of the compressor and then dividing the number of operating compressors for each capacity thereof by the unit frequency. In some implementations, as there is a unit difference between the capacity of indoor unit and the capacity of outdoor unit, a compensation constant for compensating for the unit difference may be used for the calculation.

Also, when a plurality of compressors is provided, the controller may set the operation frequency of a first compressor using a capacity of the compressor which is a value obtained by dividing the capacity of the first compressor to be controlled by the sum of the capacities of the plurality of compressors.

For example, when 20 indoor units are connected and the first and second compressors of A horsepower and the third compressor of B horsepower are provided in the first and second outdoor units, respectively, the capacities of 20 indoor units are summed up, and the amount of circulating refrigerant according to the capacity of the indoor unit is calculated. Thereafter, the operation frequency necessary for circulating refrigerant once based on volumes of the first and second compressors of the A horsepower and the third compressor of the B horsepower is set.

In some implementations, as the capacities of the first and second compressors and the third compressor are different from each other, the operation frequencies may be set differently. In order to set the operation frequencies of each compressor, the operation frequencies of each compressor may be set using the capacity ratio of the compressor to fee calculated with respect to the capacity of the whole compressors and using the number of operating compressors for each horsepower.

For example, the capacities of 20 indoor units are summed up, and a value obtained by dividing the capacity of the compressor to be controlled, that is, the capacity of the first compressor by the sum of the capacities of all of the compressors is multiplied by the sum of the capacities of the indoor units. Thereafter, the result value is divided by the sum of a value obtained of the sum of the capacities of the compressors of A power by the unit frequency for circulating refrigerant at A horsepower and a value obtained by dividing the sum of the capacities of the compressors of B power by the unit frequency for circulating refrigerant at B horsepower. Thus, the operation frequency for the first compressor may be set.

FIG. 7 is a flowchart illustrating a method for controlling an air conditioner, including determining whether refrigerant is charged according to an embodiment. As shown in FIG. 6, the air conditioner may determine an amount of circulating refrigerant during the operation (S300), and determine whether or not refrigerant charging is necessary (S305). If the refrigerant is insufficient, as the temperature of air taken out from the heat exchanger to the room does not reach the target temperature, the refrigerant shortage may be determined through a difference between the take-out temperature and the target temperature.

If it is determined that charging is necessary, the controller 1100 may output a guidance for refrigerant charging (S310). The controller 110 may generate a guidance for the refrigerant charging, transmit the generated guidance to the indoor unit, and output a refrigerant shortage alarm through a display or a speaker provided in the indoor unit.

The controller 110 may request the indoor unit to measure the temperature for the refrigerant charging (S315), and receive the indoor temperature from the indoor unit. The controller 110 may receive the indoor temperature from the indoor unit when the air conditioner is in operation, and control the air conditioner to perform an air blowing operation for a certain period of time when the air conditioner is in a stopped state, thereby receiving an indoor temperature specified during the air blowing operation.

The controller 110 may determine a bad condition based on the indoor temperature, the outdoor temperature, the connection state of the Indoor units, and the capacity of connected indoor units (S320), and thereby set the operation mode to either the cooling operation or the heating operation (S330). When the air conditioner is in operation, the controller 110 may set the refrigerant charging mode for the cooling operation during the cooling operation, and set the refrigerant charging mode for the heating operation during the heating operation, in the operation stop state, any one of the heating: operation and the cooling operation may be selected based on the indoor temperature and the outdoor temperature to set the operation mode. For example, when the indoor temperature is less than about 18 degrees, the heating operation may be set, and when the indoor temperature is about 24 degrees or more, the cooling operation may be set. In some implementations, when the outdoor temperature is less than about 19 degrees and the indoor temperature is about 24 degrees the heating operation may be set.

The controller 110 may control the outdoor unit in the set operation mode, and transmit a control command so as to operate the indoor unit in the set operation mode. As described above, the controller 110 may control the indoor unit to operate in all the rooms in accordance with the refrigerant charging mode, and control the receiver valve, the subcooler bypass valve, the main valve of the outdoor heat exchanger, the compressor operation frequency, the rotational speed of the outdoor unit fan, and the opening degree of the valve of the indoor unit. Accordingly, a pressure difference of a certain value or more may be formed in the refrigerant pipe. Also, the controller 110 may allow refrigerant in the accumulator to be discharged into the refrigerant pipe. Upon refrigerant charging, as the introduced refrigerant flows info the accumulator, the amount of refrigerant in the accumulator may be reduced in order to receive the introduced refrigerant.

The controller 110 may output a guidance indicating a refrigerant charging standby state to the refrigerant display 163 while maintaining the operation in a state of removing factors influencing the determination of refrigerant amount (S340).

Also, the controller 110 may set the operation frequency of the compressor based on the information about the indoor unit, that is, the capacity of the indoor unit and the capacity of the compressor of the outdoor unit. In some implementations, the operation frequency of the compressor is an operation frequency when the all-room operation is performed in accordance with the capacity of the indoor unit.

The controller 110 may apply a control command to the compressor drive unit such that the compressor operates at the set operation frequency, and the compressor drive unit may control the motor of the compressor to allow the compressor to operate at the set operation frequency.

When the refrigerant charging button or the refrigerant charging valve 161 is manipulated (S350), refrigerant may be automatically introduced from the refrigerant drum connected to the refrigerant charging pipe 162 due to the pressure difference of the refrigerant pipe. In some implementations, when the refrigerant charging button is input, the controller may control the refrigerant charging valve to supply the refrigerant through the refrigerant charging pipe, thereby starting the refrigerant charging. Also, when the refrigerant charging valve is operated, the controller 110 may determine that the refrigerant charging starts.

When the refrigerant charging valve is opened, refrigerant is automatically introduced into the refrigerant pipe through the refrigerant charging, pipe by a pressure difference with the refrigerant pipe (S360). The introduced refrigerant may be introduced into the accumulator through the refrigerant pipe, and liquid refrigerant separated by the accumulator and then moved to the liquid refrigerant pipe.

The controller 110 may continuously calculate the amount, of circulating refrigerant during the refrigerant charging (S370). The controller 110 may output information on the amount of refrigerant to be charged through the refrigerant display. The refrigerant display may output information on the refrigerant charging state.

The controller 110 may collect data, such as the indoor unit capacity, the compressor capacity, and the take-out temperature, and calculate the amount of refrigerant. Also, the controller 110 may determine the amount of refrigerant corresponding to the condensation temperature, the indoor unit inlet pipe temperature, the indoor temperature, the outdoor temperature inputted through the temperature sensor, the suction superheat degree, and the opening degree of the main valve. As the opening degree of the main valve increases as the amount of flowing refrigerant increases, the controller 110 may determine the amount of flowing refrigerant using the opening degree of the main valve.

As the amount of refrigerant to be determined varies according to the degree of the refrigerant charging from the outside, the controller 110 may continuously determine the amount of refrigerant while maintaining the operating, state, and determine the timing of stopping the refrigerant charging.

When the calculated amount of refrigerant reaches a target amount of refrigerant, the controller 110 may determine that the amount of refrigerant is normal (S380), and stop the refrigerant charging (S390). When the determined amount of refrigerant reaches a reference value calculated in consideration of the capacity of the connected indoor units, the controller 110 may determine that the amount of refrigerant is appropriate, and stop, the refrigerant charging. The controller 110 may control the four-way valve to change the flow path of the refrigerant, and reduce the pressure difference of the refrigerant pipe, thereby preventing refrigerant from being introduced and stopping the refrigerant charging.

The controller 110 may cancel the refrigerant charging mode, and output a guidance for completion, of refrigerant charging through the refrigerant display. The controller 110 may allow the refrigerant charging valve to be closed. In some implementations, the refrigerant charging valve may be manipulated into a closed state by a user according to the guidance of the refrigerant display. A user may determine that the refrigerant charging is completed, close the refrigerant charging valve, separate the refrigerant drum from the refrigerant charging pipe, and complete the refrigerant charging. As the refrigerant charging is completed, the controller 110 may control to operate in accordance with a preset operation setting, or stop the operation.

FIG. 8 is a flowchart illustrating a method for charging a refrigerant of an air conditioner according to an embodiment. As described above, when refrigerant is charged, the controller 110 may set the operation frequency of the compressor such that the compressor operates at the set operation frequency.

As shown in FIG. 8, the controller 110 may receive information about the indoor unit from the indoor unit through the communication unit, check the capacities of all the indoor units connected thereto, and then sum up the capacities, the indoor units (S410). Also, the controller 110 may determine a combination of the outdoor units, that is, whether or not the outdoor unit is connected in plurality, and determine the capacities of the compressors according to the combination of the outdoor units (S420 and S430). For example, the capacity of the compressor may be determined with respect to a combination of one outdoor unit and one compressor, a combination of one outdoor unit and two compressors, or a combination of a plurality of outdoor units connected to each other for example.

The controller 110 may set the operation mode, and determine the amount of circulating refrigerant. Also, the controller 110 may calculate the amount of refrigerant necessary for circulation, based on the sum of the capacities of the indoor units and the capacity of the outdoor unit compressor (S440). In some implementations, the controller may calculate the amount of refrigerant based on at least one of the condensation temperature, the inlet pipe temperature of the indoor unit, the opening degree of the main valve, the indoor temperature, the suction superheat degree, or the outdoor temperature.

As described in FIG. 5 above, the controller 110 may set a target operation frequency for the compressor based on the sum of the capacities of the indoor units and the capacity of the outdoor unit compressor (S450). The controller 110 may control the compressor drive unit such that the compressor operates at the set operation frequency, and the compressor driving unit controls the motor of the compressor to allow the compressor to operate at the set operation frequency (S460).

Generally, the compressor operates on the basis of a target low pressure and a target high pressure, but when the operation frequency of the compressor is changed, the amount of refrigerant which is calculated is also changed. Accordingly, the controller allows the compressor to operate at a set operation frequency when the refrigerant charging mode is set. In the refrigerant charging mode, the compressor operates at a fixed operation frequency regardless of the target low pressure and the target high pressure, that is, at the operation frequency set by the controller 110. Accordingly, in the process of charging the refrigerant, as errors according to the determination of the amount of refrigerant are reduced. It is possible to determine the time to end the refrigerant charging through the determination of the amount of refrigerant.

When the operation starts and the refrigerant charging starts, the controller 110 may continuously determine the amount of circulating refrigerant, and stop the refrigerant charging when the amount of refrigerant reaches a target value, that is, when the amount of refrigerant necessary for circulation is reached.

According to embodiments disclosed herein, it is possible to automatically charge refrigerant regardless of the cooling operation and the heating operation, and it is not necessary to stand by until the temperature rises for the cooling operation. Also, refrigerant may be easily charged during the heating operation without performing excessive cooling operation. Also, embodiments disclosed herein minimize an influence by fixing values regarding factors affecting the determination of the amount of refrigerant during the refrigerant charging, and make it possible to accurately determine the amount of refrigerant by allowing the compressor to operate at a set operation frequency. Accordingly, it is possible to determine whether or not the amount of refrigerant is normal based, on the calculated amount of refrigerant, and thereby the refrigerant charging may be stopped. By stopping the charging of the refrigerant according to the determined amount of refrigerant, the necessary amount of refrigerant may be automatically charged without measuring the amount of refrigerant by a user. Also, the air conditioner may be more stably operated without deficient refrigerant charging or excessive refrigerant charging.

Embodiments disclosed herein provide an air conditioner and a control method thereof, which determine a shortage of refrigerant to calculate an amount of refrigerant to be charged, performs a cooling operation or a heating operation according to a temperature to automatically charge a necessary amount of refrigerant, and controls an operation frequency of a compressor when refrigerant is supplemented.

An air conditioner according to an embodiment of the present invention may include a compressor, an accumulator that recovers a liquid refrigerant contained in a refrigerant flowing into the compressor; an outdoor heat exchanger that performs heat exchange of air using the refrigerant; an outdoor unit fan that supplies outside air to the outdoor heat exchanger and discharges heat-exchanged air; a refrigerant charging pipe connected to a refrigerant pipe and allowing Use refrigerant to be additionally introduced from the outside; a refrigerant charging valve installed in the refrigerant charging pipe to open and close the refrigerant charging pipe; and a controller that sets an operation mode so as to operate in a cooling operation or a heating operation upon setting of a refrigerant charging mode, setting an operation frequency of the compressor in accordance with a load of an indoor unit upon the setting of the refrigerant charging mode to allow the compressor to operate at the set operation frequency during the refrigerant charging, and calculates an amount of refrigerant to stop the refrigerant charging when a predetermined reference value is reached.

Also, a control method of an air conditioner according to an embodiment may include determining an amount of refrigerant; setting a refrigerant charging mode so as to operate in any one of a cooling operation mode or a heating operation mode when a preparation for refrigerant charging is completed; setting an operation frequency of a compressor in accordance with a capacity of a connected indoor unit and a capacity of the compressor; operating the compressor at the operation frequency; opening a refrigerant charging valve installed in a refrigerant charging pipe to introduce refrigerant from the outside; determining whether or not the amount of refrigerant is normal by calculating the amount of refrigerant during the refrigerant charging; and stopping the refrigerant charging when the amount of refrigerant is normal.

The air conditioner and the control method thereof according to embodiments configured as described above can calculate a refrigerant charging amount by determining a shortage of refrigerant, operate in a cooling operation or a heating operation in accordance with the outdoor temperature, and allow refrigerant to be automatically charged regardless of the cooling operation and the heating operation. Accordingly, as refrigerant can be charged even during the heating operation as wall as the cooling operation, refrigerant can be charged immediately when the refrigerant charging is needed, without excessively performing the cooling operation or waiting for the rise of the outdoor temperature.

Embodiments disclosed herein overcome the limitation of deterioration of cooling and heating efficiency due to a shortage of refrigerant, may prevent a damage of the air conditioner due to an excessive cooling operation, and may automatically supply refrigerant as much as needed based on a calculated amount of refrigerant, thereby easily supplementing refrigerant. Also, according to embodiments disclosed herein, as the operation frequency of the compressor is controlled according to a load of the indoor unit, it is possible to accurately calculate the amount of refrigerant during the refrigerant charging. Accordingly, when refrigerant is supplemented, the amount of refrigerant may be accurately calculated, and refrigerant automatically supplied as much as needed, thereby easily supplementing refrigerant. Also, refrigerant is allowed net to be insufficiently or excessively charged. Thus, the air conditioner be more stably operated.

All components constituting embodiments have been described as being combined and operating together, but are not necessarily limited to these embodiments. Within the scope, all of the components may selectively operate in combination with one or more according to the embodiments. The description above is merely illustrating the technical spirit, and various changes and modifications may be made by those skilled in the art without departing from the essential characteristics. Although embodiments have been disclosed for illustrative purposes, those skilled in the art will appreciate that various modifications, additions and substitutions are possible, without departing from the scope and spirit as disclosed in the accompanying claims.

It will be understood that when an element or layer is referred to as being "on" another element or layer, the element or layer can be directly on another element or layer or intervening elements or layers, in contrast, when art element is referred to as being "directly on" another element or layer, there are no intervening elements or layers present. As used herein, the term "and/or" includes any and all combinations of one or more of the associated listed items.

If will be understood that, although the terms first, second, third, etc., may be used herein to describe various elements, components, regions, layers and/or sections, these elements, components, regions, layers and/or sections should not be limited by these terms. These terms are only used to distinguish one element component, region, layer or section from another region, layer or section. Thus, a first element, component, region, layer or section could be termed a second element, component, region, layer or section without departing: from the teachings of the present invention.

Spatially relative terms, such as "lower", "upper" and the like, may be used herein for ease of description to describe the relationship of one element or feature to another element (s) or feature(s) as illustrated in the figures. It will be understood that the spatially relative terms are intended to encompass different orientations of the device in use or operation, in addition to the orientation deplered in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptor's used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section Illustrations that are schematic illustrations of Idealized embodiments (and intermediate structures) of the disclosure. As such, variations from the shapes of the illustrations as a result, for example, of manufacturing techniques and/or tolerances, are to foe expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that, a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An air conditioner, comprising:
   at least one outdoor unit; and
   a plurality of indoor units;
   wherein the at least one outdoor unit comprising:
      a plurality of compressors;
      an accumulator that recovers a liquid refrigerant contained in refrigerant flowing into the compressor;
      an outdoor heat exchanger that performs heat exchange of air using the refrigerant;
      an outdoor unit fan that supplies outside air to the outdoor heat exchanger and that discharges heat-exchanged air;
      a refrigerant charging pipe connected to a refrigerant pipe and allowing additional refrigerant to be charged;
      a refrigerant charging valve installed in the refrigerant charging pipe to open and close the refrigerant charging pipe; and
      a controller configured to:
         set an operation mode so as to operate in a cooling operation or a heating operation upon setting of a refrigerant charging mode,
         set an operation frequency of the compressors in accordance with a load of the plurality of indoor units upon the setting of the refrigerant charging mode to allow the compressors to operate at the set operation frequency during refrigerant charging, and
         calculate a present amount of refrigerant flowing between the indoor units and the at least one outdoor unit during refrigerant charging in order to stop the refrigerant charging when a reference value is reached,
         wherein the controller receives information of the plurality of indoor units, a number of the outdoor units, and information about the compressors provided in the at least one outdoor unit, calculates an amount of refrigerant necessary for the plurality of indoor units to operate in all rooms based on capacity of the compressors, sets the operation frequency of the compressors for circulating the refrigerant in proportion to a capacity of the plurality of indoor units, a combination of the compressors, and the capacity of the compressors.

2. The air conditioner of claim 1, wherein the controller controls the compressors to fixedly operate at the operation frequency regardless of a pressure of the refrigerant pipe when the refrigerant charging mode is set.

3. The air conditioner of claim 1, wherein the controller calculates an amount of refrigerant for circulating necessary for circulation in each of the plurality of indoor units in accordance with the capacity of the plurality of indoor units, and calculates a unit frequency of the compressors necessary for circulating the refrigerant based on a target amount of refrigerant for each compressor capacity.

4. The air conditioner of claim 3, wherein the controller sets the operation frequency of the compressors by multiplying a sum of the capacities of the plurality of indoor units by the capacity of the compressors and then dividing a number of the operating compressors for each capacity of the compressors by the unit frequency.

5. The air conditioner of claim 1, wherein the controller sets operation frequencies for each of the plurality of compressors.

6. The air conditioner of claim 5, wherein the controller sets an operation frequency of a first compressor in accordance with a value obtained by dividing a capacity of the first compressor to be controlled by the sum of the capacities of the plurality of compressors.

7. The air conditioner of claim 1, wherein the controller calculates the present amount of refrigerant based on the data input in accordance with a condensation temperature, an indoor unit inlet pipe temperature, an indoor temperature, an outdoor temperature input through a temperature sensor, a suction superheat degree, and an opening degree of a main valve, sets the reference value based on the capacity of the plurality of indoor units, when the present amount of refrigerant reaches the reference value, determines that the amount of refrigerant is appropriate, and controls a four-way valve to stop the refrigerant charging.

8. The air conditioner of claim 1, wherein when the refrigerant charging mode is set, in order to control the amount of refrigerant, the controller controls an opening degree of an electronic expansion valve provided in each of the indoor units, a rotational speed of the outdoor unit fan, a sub cooler bypass valve, a receiver valve connected to a receiver, and a valve opening degree of a main valve of the outdoor heat exchanger.

9. The air conditioner of claim 1, wherein the controller controls the amount of refrigerant in the accumulator to decrease when the refrigerant charging mode is set, and stores the refrigerant introduced through the refrigerant charging pipe in the accumulator.

10. The air conditioner of claim 1, further comprising a refrigerant display disposed adjacent to the refrigerant charging valve to output a refrigerant charging state, wherein the controller outputs a guidance on a refrigerant charging standby state upon setting of the refrigerant charging mode and a guidance on charging completion through the refrigerant display upon completion of the refrigerant charging.

* * * * *